United States Patent
Genda (10) Patent No.: US 9,858,209 B1
(45) Date of Patent: *Jan. 2, 2018

(54) METHOD AND APPARATUS FOR RESTORING DE-DUPLICATED DATA

(71) Applicant: Veritas Technologies LLC, Mountain View, CA (US)

(72) Inventor: Jon Genda, Rogers, MN (US)

(73) Assignee: Veritas Technologies LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/763,910

(22) Filed: Feb. 11, 2013

Related U.S. Application Data (63) Continuation of application No. 12/415,464, filed on Mar. 31, 2009, now Pat. No. 8,375,183.

(51) Int. Cl.
  *G06F 12/16* (2006.01)
  *G06F 12/00* (2006.01)

(52) U.S. Cl.
  CPC .................... *G06F 12/16* (2013.01)

(58) Field of Classification Search
  CPC .............. G06F 3/0641; G06F 11/1453; G06F 17/3015; G06F 12/16
  USPC ........................................................ 711/162
  See application file for complete search history.

(56) References Cited

U.S. PATENT DOCUMENTS

| | | | |
|---|---|---|---|
| 7,472,242 B1 * | 12/2008 | Deshmukh | G06F 11/1451 711/162 |
| 7,814,074 B2 * | 10/2010 | Anglin et al. | 707/692 |
| 2009/0234892 A1 * | 9/2009 | Anglin et al. | 707/201 |
| 2010/0042790 A1 * | 2/2010 | Mondal et al. | 711/161 |
| 2010/0174881 A1 * | 7/2010 | Anglin et al. | 711/162 |

* cited by examiner

*Primary Examiner* — Ann J Lo
*Assistant Examiner* — Eric Loonan
(74) *Attorney, Agent, or Firm* — Campbell Stephenson LLP (57) ABSTRACT

Method and apparatus for archiving de-duplicated data maintained by an intelligent backup appliance are described. In some examples, backup data managed by a backup appliance in a computer system is archived. A request to archive selected backup images of a plurality of backup images maintained by the backup appliance is received. The selected backup images are compared with a pool of de-duplicated data for the plurality of backup images maintained by the backup appliance to identify common data among the selected backup images and unique data in each of the selected backup images. A core backup is stored on first archive storage media, the core backup including at least a portion of the common data. A unique backup is stored on second archive storage media, the unique backup including the unique data a reference to the core backup stored on the first archive storage media.

25 Claims, 4 Drawing Sheets

FIG. 6 de-duplicated data maintained by an intelligent backup appliance.

METHOD AND APPARATUS FOR RESTORING DE-DUPLICATED DATA

CROSS-REFERENCE TO RELATED APPLICATIONS

This application is a continuation of U.S. patent application Ser. No. 12/415,464 (now U.S. Pat. No. 8,375,183), entitled "Method and Apparatus for Archiving De-Duplication Data Maintained by an Intelligent Backup Appliance" filed Mar. 31, 2009, and naming Jon Genda as the inventor. This application is assigned to Symantec Corporation, the assignee of the present invention, and is hereby incorporated by reference in its entirety and for all purposes as if completely and fully set forth herein.

BACKGROUND OF THE INVENTION

Field of the Invention

The present invention relates generally to computer systems. More particularly, the present invention relates to a method and apparatus for archiving de-duplicated data maintained by an intelligent backup appliance.

Description of the Related Art

Computer systems typically include many client computers coupled to a network. For data protection, such computer systems can include one or more backup appliances for backing up data stored on the client computers. A modern backup appliance can store much of the backup data in a de-duplicated state. With de-duplication, common data is stored only once. Backup images include unique data and references to the common de-duplicated data.

In some cases, the backup data maintained by a backup appliance is archived to archival storage (e.g., for off-site storage). Exemplary archive storage includes tape storage. Presently, to make an archive of the backup data, a backup appliance reassembles each backup image by using the references therein to combine the unique data and the common data. A complete copy of each backup image is then stored on archive storage media. Since an entire copy of each backup image is archived, a large amount of common data is duplicated across the archive storage media. As the number of backup images to be archived increases, the amount of duplicate data that is being stored also increases. This redundant copying of common data results in a large amount of wasted space on the archive storage media, requires more archive storage media than necessary, and requires more time to perform the archive process than necessary.

SUMMARY OF THE INVENTION

Aspects of the invention relate to a method, apparatus, and computer readable medium for archiving backup data managed by a backup appliance in a computer system. In some embodiments, a request to archive selected backup images of a plurality of backup images maintained by the backup appliance is received. The selected backup images are compared with a pool of de-duplicated data for the plurality of backup images maintained by the backup appliance to identify common data among the selected backup images and unique data in each of the selected backup images. A core backup is stored on first archive storage media, the core backup including at least a portion of the common data. A unique backup is stored on second archive storage media, the unique backup including the unique data a reference to the core backup stored on the first archive storage media.

In some embodiments, a redundant portion of the common data is determined to have been previously stored on third archive storage media, wherein the core backup includes only the common data other than the redundant portion; and wherein the unique backup includes a reference to the redundant portion stored on the third archive storage media.

In some embodiments, new de-duplicated data is identified in the pool of de-duplicated data that is common among the selected backup images. An incremental backup to the core backup is stored on the first archive storage media or third archive storage media, the incremental backup including the new de-duplicated data.

In some embodiments, the selected backup images is compared with the pool of de-duplicated data to identify new unique data in each of the selected backup images. An incremental backup to the unique backup is stored on the second archive storage media or third archive storage media, the incremental backup including the new unique data.

In some embodiments, new de-duplicated data is identified in the pool of de-duplicated data that is common among the selected backup images. The selected backup image is compared with the pool of de-duplicated data to identify new unique data in each of the selected backup images. An incremental core backup to the core backup is stored on the first archive storage media or third archive storage media, the incremental core backup including the new de-duplicated data. An incremental unique backup to the unique backup is stored on the second archive storage media or fourth archive storage media, the incremental unique backup including the new unique data.

In some embodiments, the first archive storage media and the second archive storage media each include one or more tapes. In some embodiments, the request is received in response to an archive schedule.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
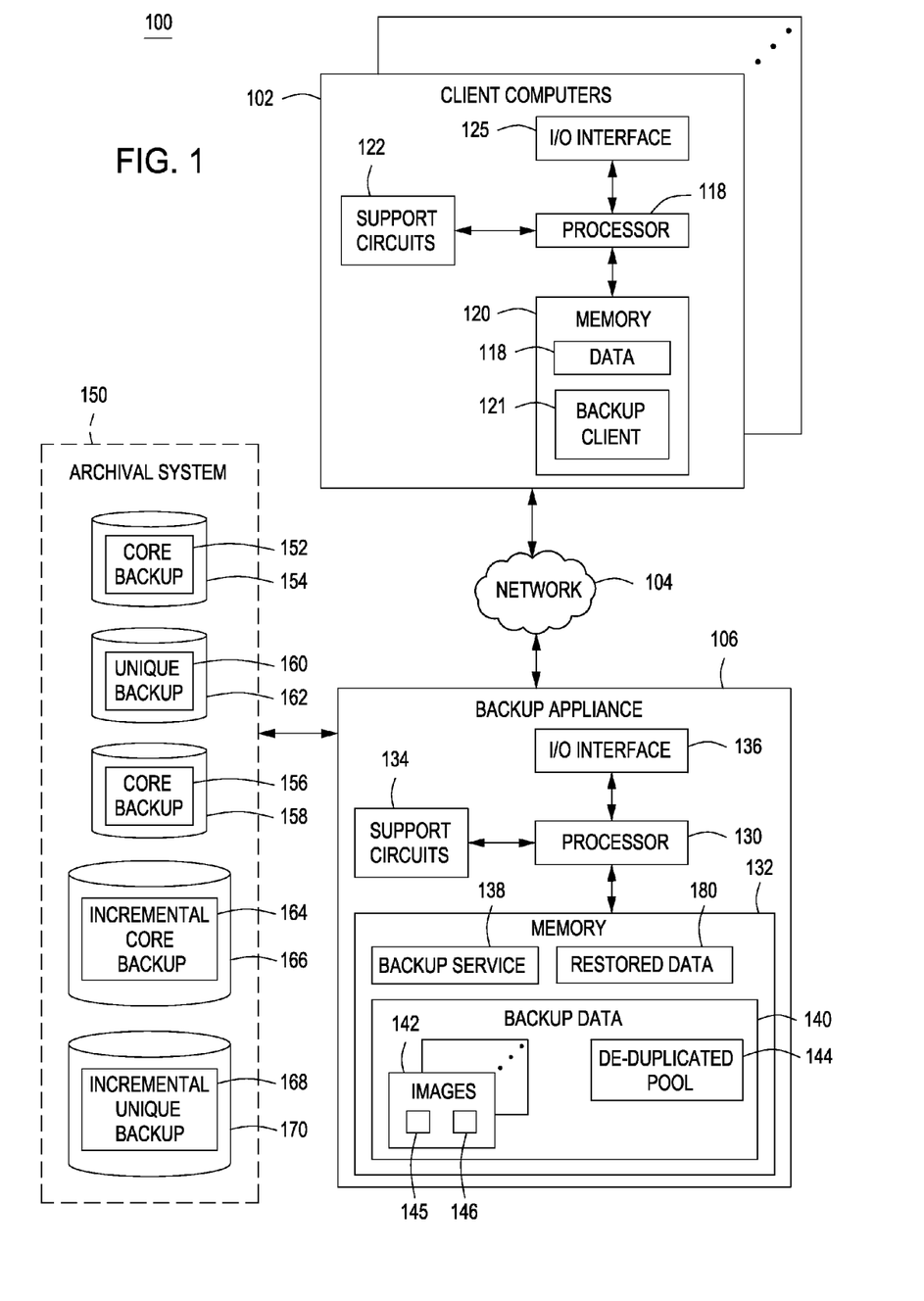
FIG. 1 is a block diagram depicting an exemplary embodiment of a computer system in accordance with one or more aspects of the invention.

FIG. 1 is a block diagram depicting an exemplary embodiment of a computer system 100 in accordance with one or more aspects of the invention. The system 100 includes client computers 102, a network 104, a backup appliance 106, and an archival storage system 150. The network 104 comprises a communication system that connects computer systems by wire, cable, fiber optic, and/or wireless links facilitated by various types of well-known network elements, such as hubs, switches, routers, and the like. In particular, the network 104 may connect the client computers 102 and the backup appliance 106. The network 104 may employ various well-known protocols to communicate information. For example, the network 104 may employ internet protocol (IP), transmission control protocol (TCP), and the like for the transmission of packets. The network 104 may comprise part of a wide area network (WAN), such as the Internet, and/or all or part of a local area network (LAN). Alternatively, the network 104 may comprise a storage area network (SAN) implemented using fibre channel (FC) or the like.

Each of the client computers 102 illustratively includes a processor 118, a memory 120, various support circuits 122, an I/O interface 125. The processor 118 may include one or more microprocessors known in the art. The support circuits 122 for the processor 118 include conventional cache, power supplies, clock circuits, data registers, I/O interfaces and/or devices, human interface devices (HIDs), displays, and the like. The I/O interface 125 may be configured for communication with the network 104. The memory 120 may include one or more of the following random access memory, read only memory, magneto-resistive read/write memory, optical read/write memory, cache memory, magnetic read/write memory, and the like.

Each of the client computers 102 is configured to store data 118. The data 118 can include various files stored in the memory 120. Each of the client computers 102 is further configured with a backup client 121. The backup client 121 may include software configured for execution by the processor 118 and configured to interact with the backup appliance 106 to perform a backup of the data 118. The backup client 121 in each of the client computers 102 may perform multiple backups of the data 118 over time in accordance with a schedule. Some portion of the data 118 may be common across one or more of the client computers 102, and some portion of the data 118 may be unique across one or more of the client computers 102. Further, for a given client computer 102, multiple backups of the data 118 may include some common data and some unique data among the multiple backups.

The backup appliance 106 illustratively includes a processor 130, a memory 132, various support circuits 134, an I/O interface 136. The processor 130 may include one or more microprocessors known in the art. The support circuits 134 for the processor 130 include conventional cache, power supplies, clock circuits, data registers, I/O interfaces and/or devices, human interface devices (HIDs), displays, and the like. The I/O interface 136 may be configured for communication with the network 104. The memory 132 may include one or more of the following random access memory, read only memory, magneto-resistive read/write memory, optical read/write memory, cache memory, magnetic read/write memory, and the like.

The backup appliance 106 is configured with a backup service 138. The backup service 138 may include software configured for execution by the processor 130 and configured to communicate with the backup client 121 in each of the client computer 102 to backup the data 118 therein. Thus, the backup service 138 manages backup data 140. The backup data 140 includes a plurality of backup images 142. A "backup image" represents a particular copy of the data 118 in a particular one of the client computers 102. The backup data 140 may include several backup images for each of the client computers 102. The backup service 138 is further configured to implement data de-duplication for the backup data 140. Through data de-duplication, the backup data 140 includes pool of de-duplicated data ("de-duplicated data pool 144") for the plurality of backup images 142. The de-duplicated data pool 144 includes data that is common among sets of the backup images 142. Each of the backup images 142 includes data unique among the backup images 142 ("unique data 145"), as well as references 146 to data in the de-duplicated data pool 144. Such de-duplication reduces the amount of storage needed to store the backup data 140, since redundant data among the backup images 142 is only stored once.

The backup appliance 106 is coupled to the archival storage system 150 (e.g., through the I/O interface 136). The archival storage system 150 may include one or more archive storage devices configured to store data on archive storage media. Exemplary archive storage devices include tape drives, and exemplary archive storage media includes tape media. The backup service 138 is configured to archive at least a portion of the backup data 140 using the archival storage system 150. Notably, the backup service 138 is configured to leverage the de-duplication in the backup data 140 to include a core set of archive storage media for storing common data, and a unique set archive storage media for storing unique data that was not eligible for de-duplication.

Figure 5:
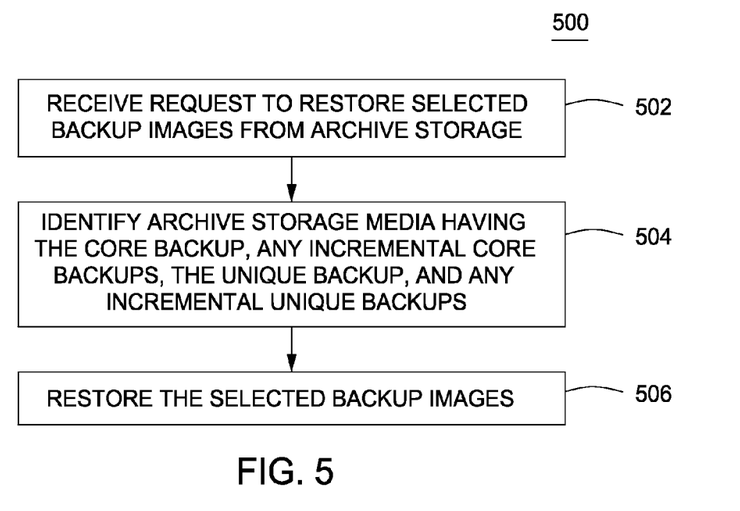
FIG. 5 is a flow diagram depicting a method for restoring archived backup data according to some embodiments of the invention.
Figure 6:
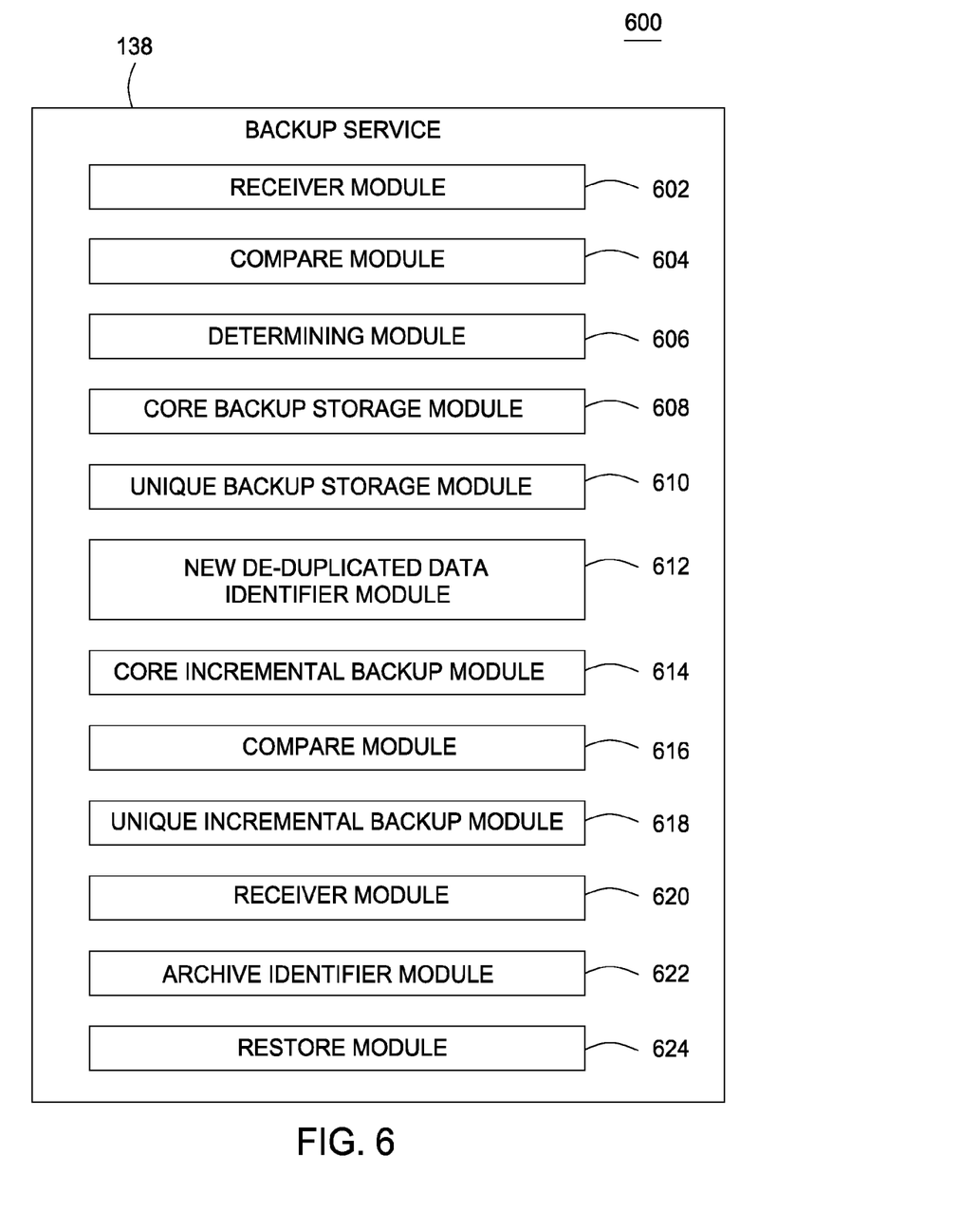
FIG. 6 is a block diagram depicting the backup service according to some embodiments of the invention

FIG. 6 is a block diagram depicting the backup service 138 according to some embodiments of the invention. The backup service 138 includes a receiver module 602, a compare module 604, a determining module 606, a core backup storage module 608, and a unique backup storage module 610. The functions of the modules 602-610 are described below with respect to FIG. 2. The backup service 138 may further include a new de-duplicated data identifier module 612 and a core incremental backup module 614. The functions of the modules 612 and 614 are described below with respect to FIG. 3. The backup service 138 may further include a compare module 616 and a unique incremental backup module 618. The functions of the modules 616 and 618 are described below with respect to FIG. 4. The backup service 138 may further include a receiver module 620, an archive identifier module 622, and a restore module 624. The functions of the modules 620-624 are described below with respect to FIG. 5. Although the backup service 138 is shown as including distinct modules each performing a specific function, it is to be understood that the backup service 138 may generally include one or more modules each performing one or more of the functions described herein. The modules 602-624 may include program code executable by the processor 130 in the backup appliance 106.

Figure 2:
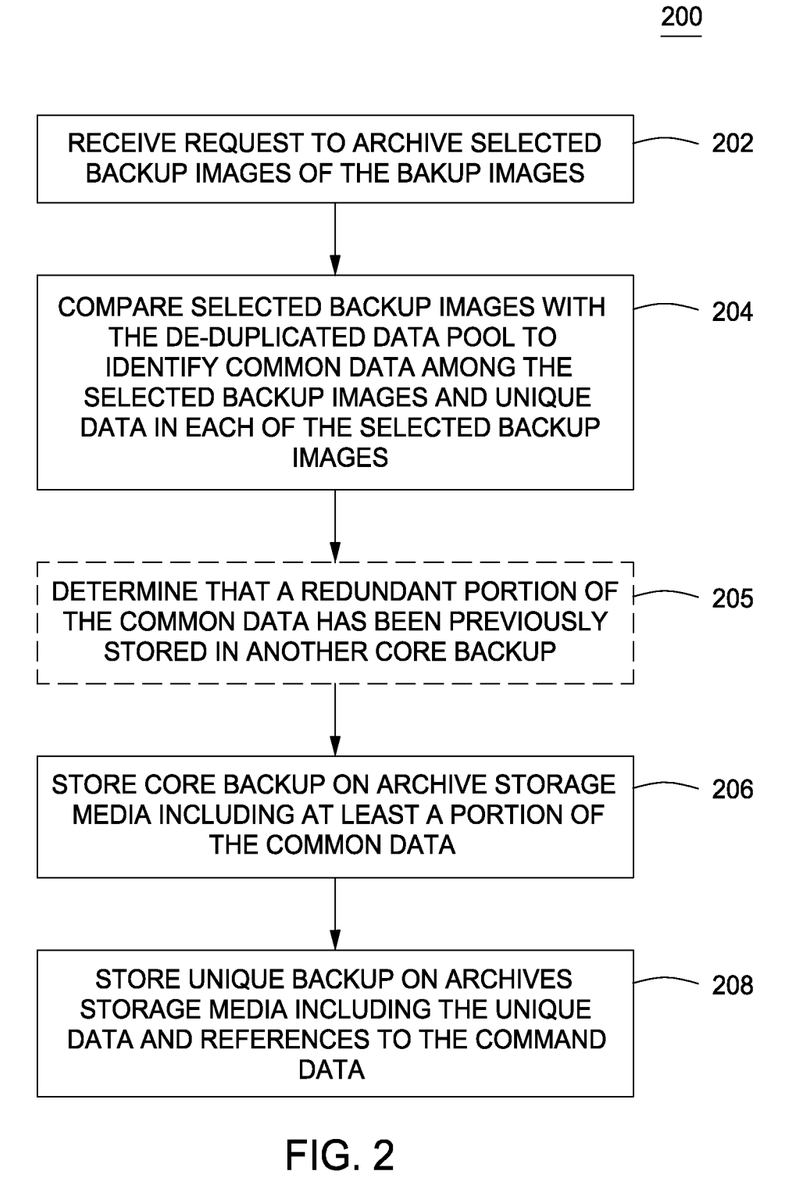
FIG. 2 is a flow diagram depicting a method of archiving backup data managed by a backup appliance in a computer system according to some embodiments of the invention.

FIG. 2 is a flow diagram depicting a method 200 of archiving backup data managed by a backup appliance in a computer system according to some embodiments of the invention. The method 200 can be implemented by the backup service 138 executed in the backup appliance 106, shown above in FIG. 1. For purposes of clarity, aspects of the method 200 are described with respect to the computer system 100 shown in FIG. 1. Further, aspects of the method 200 may be understood with reference to the modules shown in FIG. 6.

The method 200 begins at step 202, where the backup service 138 receives a request to archive selected backup images of the backup images 142 maintained by the backup appliance 106. In some embodiments, the function of receiving the request is performed by the receiver module 602. For example, an administrator may interact with the backup service 138 to select particular ones of the backup images 142 to be archived. In another example, the backup service 138 may be configured to archive specific ones of the backup images 142 based on a schedule. The selected backup images can include all or a portion of the backup images 142. At step 202, the input is the request, and the output is identification of selected backup images to be archived. The output of step 202 may be stored in the memory 132.

At step 204, the backup service 138 compares the selected backup images with the de-duplicated data pool 144 to identify common data among the selected backup images and unique data in each of the selected backup images. In some embodiments, the function of comparing the selected backup images with the de-duplicated data pool 144 is performed by the compare module 604. As noted above, each of the backup images 142 includes unique data 145, as well as references 146 to common data in the de-duplicated data pool 144. Thus, given the selected backup images, the backup service 138 can identify common data from the de-duplicated data pool 144, and the unique data 145 in each of the selected backup images. In step 204, the input is the selected backup images and the de-duplicated data pool 144, and the output is the identity of common data among the selected backup images and unique data in each of the selected backup images. The output of step 204 may be stored in the memory 132.

At step 206, the backup service 138 stores a core backup 152 on archive storage media 154 (e.g., one or more tapes). In some embodiments, the function of storing the core backup 152 is performed by the core backup storage module 608. The core backup 152 includes at least a portion of the common data identified in step 204. In some embodiments, the core backup 152 includes all of the common data identified in step 204. In some embodiments, the core backup 152 includes less than all of the common data. In step 206, the input is the common data identified in step 204, and the output is the core backup 152. The output of step 206 may be stored in the archive storage media 154.

For example, the method 200 may include an optional step 205 between steps 204 and 206. At step 205, the backup service 138 determines that a redundant portion of the common data identified in step 204 has been previously stored in a core backup 156 on archive storage media 158. In some embodiments, the function of determining is performed by the determining module 606. In step 205, the input is the common data identified in step 204 and the core backup 156, and the output is an identification of the redundant portion of the command data. The output of step 205 may be stored in the memory 132.

Then, at step 206, the backup service 138 can store only the common data other than the redundant data in the core backup 152. In essence, the backup service 138 can determine if previous core backups exist that already include elements of the identified common data. If such previous core backups exist, the backup service 138 does not redundantly store the common data in more than two core backups. Note that the redundant portion of the common data may be stored in more than one core backup 156 on archive storage media (e.g., multiple core backups).

At step 208, the backup service 138 stores a unique backup 160 on archive storage media 162 (e.g., one or more tapes). In some embodiments, the function of storing the unique backup 160 can be performed by the unique storage module 610. The unique backup 160 includes the unique data identified in step 204. The unique backup 160 also includes a reference to the core backup 152. Further, if the backup service 138 omits storing a redundant portion of the common data in the core backup 152, the unique backup 160 can include a reference to other core backup(s) having the redundant portion (e.g., the core backup 156). At step 208, the input is the unique data identified in step 204, and the output is the unique backup. The output of step 208 may be stored in the archive storage media 162.

In this manner, two backup sets are created for the selected backup images: (1) a core backup set; and (2) a unique backup set. The core backup set stores data common among the selected backup images, and the unique backup set stores data unique to each of the selected backup images. The two backup sets maintain the relationship between the de-duplicated data in the core backup sets and the unique data in the unique backup sets.

Figure 3:
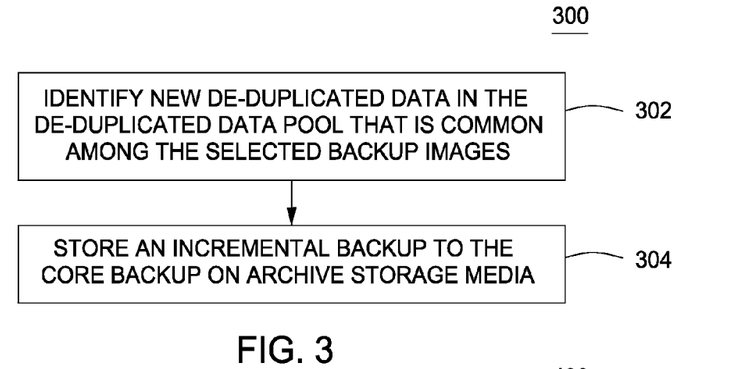
FIG. 3 is a flow diagram depicting a method of incrementally archiving backup data managed by a backup appliance in a computer system according to some embodiments of the invention.

FIG. 3 is a flow diagram depicting a method 300 of incrementally archiving backup data managed by a backup appliance in a computer system according to some embodiments of the invention. The method 300 can be implemented by the backup service 138 executed in the backup appliance 106, shown above in FIG. 1. For purposes of clarity, aspects of the method 300 are described with respect to the computer system 100 shown in FIG. 1. Further, the method 300 assumes that the backup service 138 has performed the method 200 to archive selected backup images, as described above. Further, aspects of the method 200 may be understood with reference to the modules shown in FIG. 6.

The method 300 begins at step 302, where the backup service 138 identifies new de-duplicated data in the de-duplicated data pool 144 that is common among the selected backup images. By "new", it is meant that the data was not in the de-duplicated data pool 144 when the backup data was last archived (e.g., after the method 200). For example, the backup service 138 may have performed additional backups of the data 118 in the client computers 102. In some embodiments, the function of step 302 is performed by the identifier module 612. At step 302, the input is the de-duplicated data pool 144 and the selected backup images, and the output is the new de-duplicated data. The output of step 302 may be stored in the memory 132.

At step 304, the backup service 138 stores an incremental backup 164 to the core backup 152 on archive storage media. The incremental backup 164 can be stored on the archive storage media 154 that stores the core backup 152, or different archive storage media 166. The incremental backup 164 includes the new data in the de-duplicated data pool 144 that was identified in step 302. In this manner, the backup service 138 can avoid making a new full core backup by making an incremental core backup. In some embodiments, the function of step 304 is performed by the core incremental backup module 614. At step 304, the input is the new de-duplicated data, and the output is the incremental backup 164. The output of step 202 may be stored in archive storage media 154 or the archive storage media 166.

Figure 4:
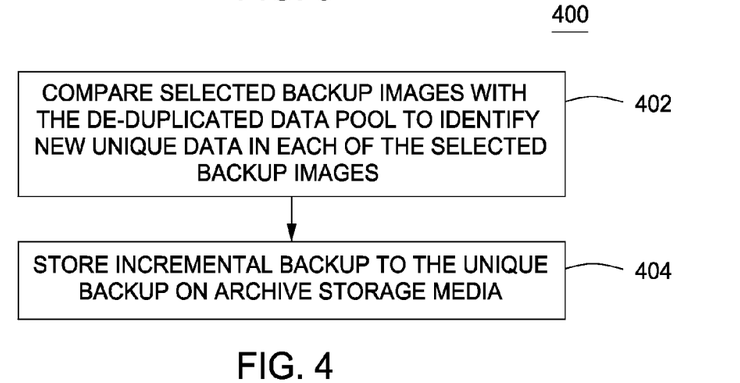
FIG. 4 is a flow diagram depicting a method of incrementally archiving backup data managed by a backup appliance in a computer system according to some embodiments of the invention.

FIG. 4 is a flow diagram depicting a method 400 of incrementally archiving backup data managed by a backup appliance in a computer system according to some embodiments of the invention. The method 400 can be implemented by the backup service 138 executed in the backup appliance 106, shown above in FIG. 1. For purposes of clarity, aspects of the method 400 are described with respect to the computer system 100 shown in FIG. 1. Further, the method 400 assumes that the backup service 138 has performed the method 200 to archive selected backup images, as described above. Further, aspects of the method 200 may be understood with reference to the modules shown in FIG. 6.

The method 400 begins at step 402, where the backup service 138 compares the selected backup images with the de-duplicated data pool 144 to identify new unique data in each of the selected backup images. By "new", it is meant that the data was not in the selected backup images when the backup data was last archived (e.g., after the method 200). For example, the backup service 138 may have performed additional backups of the data 118 in the client computers 102. In some embodiments, the function of step 402 is performed by the compare module 616. At step 402, the input is the selected backup images and the de-duplicated data pool 144, and the output is the new unique data in each of the selected backup images. The output of step 402 may be stored in the memory 132.

At step 404, the backup service 138 stores an incremental backup 168 to the unique backup 160 on archive storage media. The incremental backup 168 can be stored on the archive storage media 162 that stores the unique backup 160, or different archive storage media 170. The incremental backup 168 includes the new unique data that was identified in step 402. In this manner, the backup service 138 can avoid making a new full unique backup by making an incremental unique backup. In some embodiments, the function of step 404 is performed by the unique incremental backup module 618. At step 404, the input is the new unique data from step 402, and the output is the incremental backup 168. The output of step 402 may be stored in the archive storage media 162 or the archive storage media 170.

It is to be understood that both of methods 300 and 400 may be performed concurrently to produce incremental core backup(s) and incremental unique backup(s) over time.

FIG. 5 is a flow diagram depicting a method 500 for restoring archived backup data according to some embodiments of the invention. The method 500 can be performed by the backup service 138 executed on the backup appliance 106 shown in FIG. 1. The method 500 assumes that the backup data 140 has been archived to produce a core backup (e.g., the core backup 152) and a unique backup (e.g., the unique backup 160). Incremental core backups and/or unique backups may also have been performed (e.g., the incremental backup 164 and/or the incremental backup 168). Further, aspects of the method 200 may be understood with reference to the modules shown in FIG. 6.

The method 500 begins at step 502, where the backup service 138 receives a request to restore selected backup images from archive storage media. In some embodiments, the function of step 502 may be performed by the receiver module 620. At step 502, the input is the request, and the output is identification of selected backup images to be restored. The output of step 502 may be stored in the memory 132.

At step 504, the backup service 138 identifies archive storage media having the core backup, any incremental core backups, the unique backup, and any incremental unique backups. In some embodiments, the function of step 504 may be performed by the archive identifier module 622. At step 504, the input is the selected backup images to be restored, and the output is identified archive storage media needed to restore the selected backup images. The output of step 504 may be stored in the memory 132.

At step 506, the backup service 138 restores the selected backup images as restored data 180 in the backup appliance 106. The backup service 138 can combine the unique backup 160 with any incremental unique backups (e.g., the incremental backup 168) to obtain the unique data in each of the selected backup images. The backup service 138 can combine the core backup 152 with any incremental core backups (e.g., the incremental backup 164) to obtain the common data among the selected backup images. The backup service 138 can synthesize a complete backup image using the references in the unique data to the common data. In some embodiments, the function of step 506 may be performed by the restore module 624. At step 506, the input is the identified archive storage media identified ins step 504, and the output is the restored selected backup images in the restore data 180. The output of step 506 may be stored in the memory 132.

Aspects of the methods described above may be implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A method comprising:
archiving a backup image, wherein
the backup image is archived in an archive system, wherein
the archive system comprises a plurality of archive storage media, and
the plurality of archive storage media comprises a first archive storage medium and a second archive storage medium, and
the archiving the backup image comprises
identifying unique data in the backup image,
identifying common data in the backup image,
identifying incremental common data in the backup image,
storing the unique data in one or more unique backup storage media, and
storing the incremental common data in one or more incremental core backup storage media;
receiving a request to restore the backup image from the archive system;
identifying one or more sets of data to be used to restore the backup image, wherein
the identifying the one or more sets of data to be used to restore the backup image comprises identifying the unique data to be used to restore the backup image, wherein
the unique data comprises data that is not common among a first set of backup images stored in the archive system at a first point in time, and
the unique data is stored in the first archive storage medium, and
identifying the common data to be used to restore the backup image, wherein
the common data comprises data that is common among the first set of backup images stored in the archive system at the first point in time, and
the common data is stored in the second archive storage medium, and
identifying the incremental common data to be used to restore the backup image, wherein
the incremental common data comprises data that is common among a second set of backup images stored in the archive system at a second point in time, and
the incremental common data was not previously stored in the common data at the first point in time;
identifying one or more archive storage media of the plurality of archive storage media, wherein the one or more archive storage media stores the one or more sets of data;
retrieving the one or more sets of data from the one or more archive storage media; and
restoring the backup image, wherein
the restoring comprises synthesizing the backup image by combining the unique data, the common data, and the incremental common data.

2. The method of claim 1, wherein the unique data, the common data, and the incremental common data are identified using relationship data stored at the archive system.

3. The method of claim 1, wherein
the unique data comprises
a unique set of data, and
one or more sets of incremental unique data, and
the incremental common data comprises
one or more sets of incremental common data.

4. The method of claim 3, wherein
the one or more sets of incremental unique data and the one or more sets of incremental common data are generated according to an archive schedule.

5. The method of claim 1, wherein the identifying the one or more archive storage media further comprises:
identifying one or more unique backup storage media for storing the unique data;
identifying one or more core backup storage media for storing the common data; and
identifying one or more incremental core backup storage media for storing the incremental common data.

6. The method of claim 5, wherein the identifying the one or more archive storage media further comprises:
identifying one or more incremental unique backup storage media, wherein
the one or more incremental unique backup storage media store one or more sets of incremental unique data in the backup image.

7. The method of claim 5, wherein the retrieving the one or more sets of data further comprises:
retrieving the unique data from the one or more unique backup storage media;
retrieving the common data from the one or more core backup storage media; and
retrieving the incremental common data from the one or more incremental core backup storage media, wherein
the common data and the incremental common data are retrieved using reference information in the unique data.

8. The method of claim 7, wherein the synthesizing the one or more sets of data further comprises:
combining the unique data, the common data, and the incremental common data to generate the backup image.

9. The method of claim 1, wherein the plurality of archive storage media comprises one or more tapes.

10. The method of claim 1, wherein
the common data further comprises
data that was identified as common among backup images maintained by a backup appliance, prior to the archiving the backup image, and
data that was stored as common data in the archive system, prior to the archiving the backup image; and
the incremental common data further comprises
data that was identified as newly common among backup images maintained by the backup appliance, at the time of the archiving the backup image, and
data that was not previously stored in the archive system, prior to the archiving the backup image.

11. The method of claim 1, further comprising:
performing a first level of deduplication, wherein
the performing the first level of deduplication comprises
maintaining a set of common data at a backup appliance, wherein
the set of common data represents data that is common within a plurality of backup images stored at the backup appliance at the time the first level of deduplication is performed, and
the set of common data comprises the common data in the backup image, and
storing the common data in the archive system in one or more core backup storage media; and
after performing the first level of deduplication, performing a second level of deduplication, wherein
the performing the second level of deduplication comprises
comparing the data in the backup image with the set of common data to identify the unique data and the incremental common data in the backup image, wherein
the unique data represents data that is unique among all backup images stored at the backup appliance at the time the second level of deduplication is performed, and
the incremental common data represents data that is newly common since performing the first level of deduplication,
storing the unique data in the archive system in one or more unique backup storage media, and
storing the incremental common data in the archive system in one or more incremental core backup storage media.

12. The method of claim 1, wherein
the incremental common data is stored in a third archive storage medium of the plurality of archive storage media.

13. The method of claim 1, wherein
a data item is stored in both the incremental common data and the unique data.

14. The method of claim 1, wherein
the unique data comprises a data item at the first point in time, and
the incremental common data comprises a copy of the data item at the second point in time.

15. The method of claim 1, wherein
the one or more sets of data used to restore the backup image comprises at least one reference to the common data.

16. A non-transitory computer readable storage medium having instructions stored thereon that when executed by a processor cause the processor to perform a method comprising:
archiving a backup image, wherein
the backup image is archived in an archive system, wherein
the archive system comprises a plurality of archive storage media, and
the plurality of archive storage media comprises a first archive storage medium and a second archive storage medium, and
the archiving the backup image comprises
identifying unique data in the backup image,
identifying common data in the backup image,
identifying incremental common data in the backup image,
storing the unique data in one or more unique backup storage media, and
storing the incremental common data in one or more incremental core backup storage media;
receiving a request to restore the backup image from the archive system;
identifying one or more sets of data to be used to restore the backup image, wherein
the identifying the one or more sets of data to be used to restore the backup image comprises
identifying the unique data to be used to restore the backup image, wherein
the unique data comprises data that is not common among a first set of backup images stored in the archive system at a first point in time, and
the unique data is stored in the first archive storage medium, and
identifying the common data to be used to restore the backup image, wherein
the common data comprises data that is common among the first set of backup images stored in the archive system at the first point in time, and
the common data is stored in the second archive storage medium, and
identifying the incremental common data to be used to restore the backup image, wherein
the incremental common data comprises data that is common among a second set of backup images stored in the archive system at a second point in time, and
the incremental common data was not previously stored in the common data at the first point in time;
identifying one or more archive storage media of the plurality of archive storage media, wherein the one or more archive storage media stores the one or more sets of data;
retrieving the one or more sets of data from the one or more archive storage media; and
restoring the backup image, wherein
the restoring comprises synthesizing the backup image by combining the unique data, the common data, and the incremental common data.

17. The non-transitory computer readable storage medium of claim 16, wherein the unique data, the common data, and the incremental common data are identified using relationship data stored at the archive system.

18. The non-transitory computer readable storage medium of claim 16, wherein
the unique data comprises
a unique set of data, and
one or more sets of incremental unique data, and
the incremental common data comprises
one or more sets of incremental common data.

19. The non-transitory computer readable storage medium of claim 18, wherein
the one or more sets of incremental unique data and the one or more sets of incremental common data are generated according to an archive schedule.

20. The non-transitory computer readable storage medium of claim 16, wherein the method for identifying the one or more archive storage media further comprises:
identifying one or more unique backup storage media for storing the unique data;
identifying one or more core backup storage media for storing the common data; and
identifying one or more incremental core backup storage media for storing the incremental common data.

21. The non-transitory computer readable storage medium of claim 20, wherein the method for identifying the one or more archive storage media further comprises:
identifying one or more incremental unique backup storage media, wherein
the one or more incremental unique backup storage media store one or more sets of incremental unique data in the backup image.

22. The non-transitory computer readable storage medium of claim 20, wherein the method for retrieving the one or more sets of data further comprises:
retrieving the unique data from the one or more unique backup storage media;
retrieving the common data from the one or more core backup storage media; and
retrieving the incremental common data from the one or more incremental core backup storage media, wherein
the common data and the incremental common data are retrieved using reference information in the unique data.

23. The non-transitory computer readable storage medium of claim 22, wherein the method for synthesizing the one or more sets of data further comprises:
combining the unique data, the common data, and the incremental common data to generate the backup image.

24. The non-transitory computer readable storage medium of claim 16, wherein
the common data further comprises
data that was identified as common among backup images maintained by a backup appliance, prior to the archiving the backup image, and
data that was stored as common data in the archive system, prior to the archiving the backup image, and
the incremental common data further comprises
data that was identified as newly common among backup images maintained by the backup appliance, at the time of the archiving the backup image, and data that was not previously stored in the archive system, prior to the archiving the backup image.

25. An apparatus comprising:
means for archiving a backup image, wherein
  the backup image is archived in an archive system, wherein
    the archive system comprises a plurality of archive storage media, and
    the plurality of archive storage media comprises a first archive storage medium and a second archive storage medium, and
  archiving the backup image comprises
    identifying unique data in the backup image,
    identifying common data in the backup image,
    identifying incremental common data in the backup image,
    storing the unique data in one or more unique backup storage media, and
    storing the incremental common data in one or more incremental core backup storage media;
means for receiving a request to restore the backup image from the archive system, wherein
  the archive system comprises a plurality of archive storage media, and
  the plurality of archive storage media comprises a first archive storage medium and a second archive storage medium;
means for identifying one or more sets of data to be used to restore the backup image, wherein
  the means for identifying the one or more sets of data to be used to restore the backup image comprises
    means for identifying the unique data to be used to restore the backup image, wherein
      the unique data comprises data that is not common among a first set of backup images stored in the archive system at a first point in time, and
      the unique data is stored in the first archive storage medium, and
    means for identifying the common data to be used to restore the backup image, wherein
      the common data comprises data that is common among the first set of backup images stored in the archive system at the first point in time, and
      the common data is stored in the second archive storage medium, and
    means for identifying the incremental common data to be used to restore the backup image, wherein
      the incremental common data comprises data that is common among a second set of backup images stored in the archive system at a second point in time, and
      the incremental common data was not previously stored in the common data at the first point in time;
means for identifying one or more archive storage media of the plurality of archive storage media that store the one or more sets of data;
means for retrieving the one or more sets of data from the one or more archive storage media; and
means for restoring the backup image, wherein
  the means for restoring comprises means for synthesizing the backup image by combining the unique data, the common data, and the incremental common data.

* * * * *